(12) United States Patent
Heckendorf (10) Patent No.: US 6,206,106 B1
(45) Date of Patent: Mar. 27, 2001

(54) HIGH SPEED GRADER

(75) Inventor: David W Heckendorf, Queensland (AU)

(73) Assignee: Savannah Forestry Equipment, LLC, Savannah, GA (US)

( * ) Notice: Subject to any disclaimer, the term of this patent is extended or adjusted under 35 U.S.C. 154(b) by 0 days.

(21) Appl. No.: 09/173,859

(22) Filed: Oct. 16, 1998

(30) Foreign Application Priority Data

Oct. 16, 1997 (AU) .................................................... PO9806

(51) Int. Cl.$^7$ ................ E02F 3/76; A01B 15/00
(52) U.S. Cl. ......................................................... 172/799.5
(58) Field of Search ........................... 172/777, 799.5, 172/199, 445.1, 307, 260.5, 265, 794, 795, 261, 263, 264; 37/232, 234; 404/90; 405/271, 303

(56) References Cited

U.S. PATENT DOCUMENTS

| | | | |
|---|---|---|---|
| 3,642,074 | * 2/1972 | Geurts | 172/261 |
| 4,364,191 | * 12/1982 | Cazes | 172/260.5 X |
| 5,562,365 | * 10/1996 | Berrange | 172/777 X |
| 5,921,010 | * 7/1999 | Schulte et al. | 37/232 |

* cited by examiner

Primary Examiner—Robert E. Pezzuto
(74) Attorney, Agent, or Firm—Quarles & Brady LLP (57) ABSTRACT

A grader to enable high speed grading for gravel or unmade roads having a plurality of grader blades the position of each blade being maintained in a forward most grading position by an hydraulic ram which is hydraulically connected a gas accumulator. The blades are collectively supported by a draft frame the height of which is changeable by a hydraulic ram also coupled to the gas accumulator. Each blade, when in its forward most position, is rearward of the axis of the pivot support for the leg supporting that blade.

23 Claims, 7 Drawing Sheets

HIGH SPEED GRADER

TECHNICAL FIELD

This invention relates to a grader of a type used to grade surfaces such as gravel or unmade roads.

It is well known to have specialist graders which have a single large blade which is supported between front and rear wheels to effect grading of roads.

Such a device is implicitly large and therefore expensive and is necessarily so in order to provide sufficient force to support the blade when cutting or shifting substantially embedded rocks or substantial quantities of earth during a grading process. Further, in order not to unduly damage the blade or the support equipment the grading speed is usually kept to a very slow speed (perhaps 3 or 4 kph.)

In accord with this invention it has been discovered that there can be a different approach to grading which allows for the grader to be made of somewhat lighter construction and to also be able to be pulled by a more conventional road vehicle without unnecessarily stressing such vehicles in the event that the grader should strike very heavy loads or even obstacles.

An object of this invention then is to provide a grader which allows for a construction that is somewhat lighter than conventional graders and which will also allow for conventional road vehicles in many instances to effect pulling of the grader and that will facilitate faster grading speeds than have hitherto been considered possible.

BRIEF SUMMARY OF THE INVENTION

According to one form of this invention there is provided a grader having at least two grader blades, each blade being positioned to effect grading of a part only of a being graded surface, each blade being supported by a respective leg for each blade each of which is joined to a support frame by a pivot connection, the position of the blade being maintained in a forward most position by an hydraulic ram the pressure of which is governed by hydraulic pressure of fluid within the ram which fluid is hydraulically connected for each of the rams to an accumulator so that the hydraulic pressure in the ram is substantially the pressure within the accumulator.

With this arrangement, when an obstacle or heavy load is encountered, then because the pressure in the hydraulic ram is implicitly averaged with the pressure of the accumulator, then the increasing pressure on the blade will be met by an increasing pressure by the blade as it swings rearwardly but not a pressure that increases directly proportionally with the length of travel of the ram. This means that the pressure that might be set at 1200 psi with the blade at a forward most position might rise only a further 20 psi with some 3–4 inches rearward movement of the blade. As a result then, the extra strain on the blade and the supporting leg and draft frame will not be excessive and furthermore in further preferred arrangements the movement of the blade can be arranged to be a clearing motion so as to reduce an abutting shape of the blade.

In preference, each hydraulic ram is coupled to the same accumulator.

In preference, the legs are each supported by a draft frame the height of which is changeable by change of pressure within an hydraulic ram extending between parts of the frame, and where the fluid in the hydraulic ram is coupled to the said hydraulic accumulator.

In preference, each blade is supported so as to be, when in its forward most position, entirely rearward of a vertical plane passing through the axis of the pivot support for the leg supporting that blade, so that rearward pivoting of the leg about its respective pivot will result in only rearward and upward motion of the blade relative to the pivot axis.

In preference there is provided a grader including a hitch point on the draft frame, a ground engaging wheel or wheels supporting and defining at least in part the height of the draft frame with respect to the ground, a plurality of grader blades each independently supported so as to present, in a staggered alignment, a grading face each with a lowermost grading edge, each of the blades being supported so as to assume at least two positions relative to the draft frame, a first of these being a grading position, and a second of these being a release position, the release position being achieved when pressure against the blade is in excess of a selected level, and means to lift or lower the blades collectively in the event the grading pressure against two or more of the blades collectively is above a selected pressure.

In preference, each of the blades is supported by a pivotal connection to the draft frame, and the blade is maintained in position by an hydraulic ram.

In preference, the means to lift or lower the blades collectively in the event the grading pressure against two or more blades is outside a selected range of pressures, includes a hydraulic ram, and a linkage arranged so that in one position of the draft frame hydraulic ram, the draft frame is supported in a higher position relative to the hitch point and the ground engaging wheels as compared to alternate position.

In preference, the pressure in each of the hydraulic rams supporting each of the blades is coupled to a common plenum accumulator.

In preference each hydraulic ram is also coupled to the draft frame hydraulic ram such that when additional pressure against the blades is effected with respect to the said hydraulic rams, then there is additional pressure being forced into the draft frame hydraulic ram.

One of the advantages of the arrangement having the above features is that by having individual blades which are aligned in staggered fashion so that any individual blade engages only part of the surface to be graded, is that in the event that one blade strikes a rock, then the all up weight and therefore inertia available to resist a quick release of that blade from a grading position to a release position, is somewhat smaller than would be the case if there was one big single blade.

Further, while one blade releases, the other blades continue to grade at a lower level therefore at least continuing to provide an effective grading effect even though a single stone has not been shifted.

However, when two or more blades start to encounter rocks very much at the same time or encounter an amount of earth that means large stresses are starting to occur, then there is the effect that this will result in additional pressure from the several hydraulic rams being pushed into a release position which in turn then will raise the pressure in a draft frame hydraulic ram which then in turn will collectively lift all of the blades to a higher position at least until the substantial load is lessened.

In a practical example, it has been found that a grader having these features can be used behind a four wheel drive motor vehicle and can be used as a grader without unduly stressing the hitch and other parts of the motor vehicle even though it is being pulled at a quite substantial speed of perhaps anything from 10 to 15 kph. What this means is that the station owner wishes to, they can hitch such a grader behind their conventional four wheel drive Toyota or Land Cruiser and use the grader when proceeding along otherwise unmade tracks or low priority roads at a relatively high speed at least for grading purposes.

The mechanism describes which-is that there are these individual blades each able to be individually released but if there is a collective pressure which is higher than normal, then there is this automatic lifting all of which occurs without the direct or manual intervention of the person dragging the grader.

BRIEF DESCRIPTION OF THE DRAWINGS

For a better understanding of this invention it will now be described in relation an embodiment which shall be described with the assistance of drawings wherein.

DETAILED DESCRIPTION

Now referring in detail to the drawings, and in particular to FIGS. 1, 2, 3 and 4, a grader 1 is comprised of a draft frame 2 which includes a front cross bar 3, a middle cross bar 4 and a rearward cross bar 5.

Further, the draft frame 2 includes a forwardly extending draft arm 6 at the forward most end of which is located a head 7 adapted to fit with rotational freedom and appropriate hitch point on a towing vehicle which is not shown.

There are ground engaging wheels 9 and 10 on the one hand and 11 and 12 on the other these being supported by pivotally supported beam 13 with the wheels at each end in the case of 9 and 10 and beam 14 in the case of wheels 11 and 12. The orientation of the trailing arm support 5 governs the position of arms 15 and 16 which at an outer end of each is coupled through a pivot connection 15a in the one case and 16a in the other with the respective support beams 13 and 14.

Supported by the draft frame 2 and particularly the cross members 3 and 4 with respect to the ground are a plurality of grader blades 18 each independently supported at the end of a leg 18b by a pivot connection 18a so as to present, in a staggered alignment, for each leg a grading face 17 each with a lowermost grading edge 17b. Each of the blades 18 is supported so that it has a planar front surface defining thereby a plane that will be aligned in a perpendicular alignment to an expected forward direction of the apparatus. Further, the lowermost edge of the surface will be linear and aligned in a horizontal alignment with the ground. The support furthermore is such that the leg will be able to provide at least two positions relative to the draft frame 2, a first of these being a grading position, and a second of these being a release position. However, because the hydraulic ram in each case is connected to a gas accumulator, the degree of change in pressure caused by a shift in the position of the blade will be small so that the loading on the machine from an increase in diversion pressure of one or more of the blades will be small.

Figure 6:
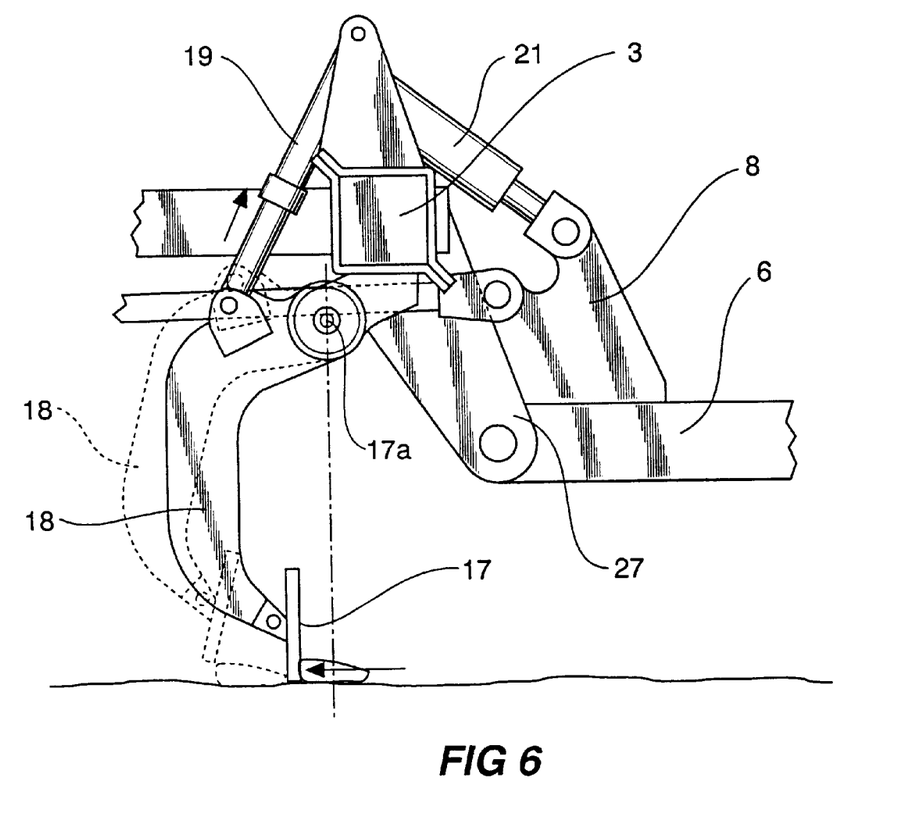
FIG. 6 is an enlarged view of a portion of the view as in FIG. 1 with however the position of the blade and leg pivoted backward as it clears an obstacle.

Further, each blade 17 is supported so as to be, when in its forward most position, entirely rearward of a vertical plane passing through the axis of the pivot support 17a for the leg 18 supporting that blade 17, so that rearward pivoting of the leg 18 about its respective pivot will result in only rearward and upward motion of the blade relative to the pivot axis. This therefore is a clearing pressure which means that the front face of the blade will increasingly incline with a lowerside more rearward than an upper side. This then helps the blade to ride over an obstacle or at the least soften any impact and therefore load. In one example the gas accumulator is coupled collectively to the hydraulic rams so that each is held in a forward most position with a pressure of 1200 pounds per square inch. With 4 inches rearward travel of the blade, this increased the pressure to 1220 pounds per square inch. The blade however with this degree of travel inclined to present an angle of 15 degrees to the vertical the lowermost edge will be raised about one inch.

The result is that the machine can be drawn at very fast speeds in grading terms and yet not subject the vehicle or even the apparatus to loads that will be destructive. This is in fact the position.

The release position is achieved when pressure against a one only of the blades 18 is in excess of a selected level but as has been pointed out the release pressure remains relatively constant because of the coupled gas accumulator providing an averaging effect on the total pressure.

This smaller individual nondestructive force is achieved by reason that each of the blades 18 is supported individually by a pivotal connection 17a to the draft frame 2, and each blade 18 is maintained in a grading position under individual pressure from an hydraulic ram 19, there being one ram 19 each for each of the blades 18 which in turn is connected to an accumulator.

Figure 1:
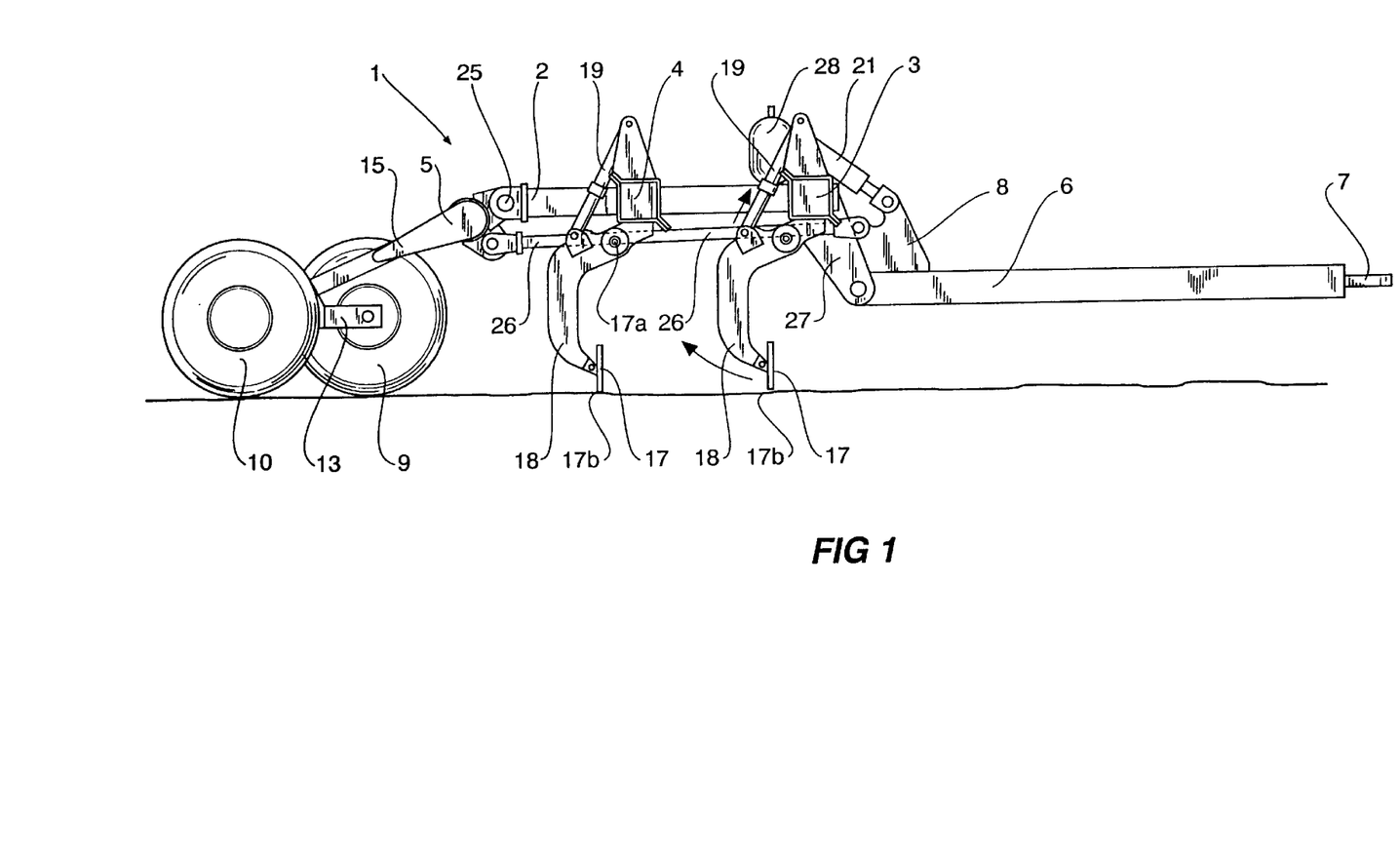
FIG. 1 is a side view of a grader according to the embodiment.
Figure 2:
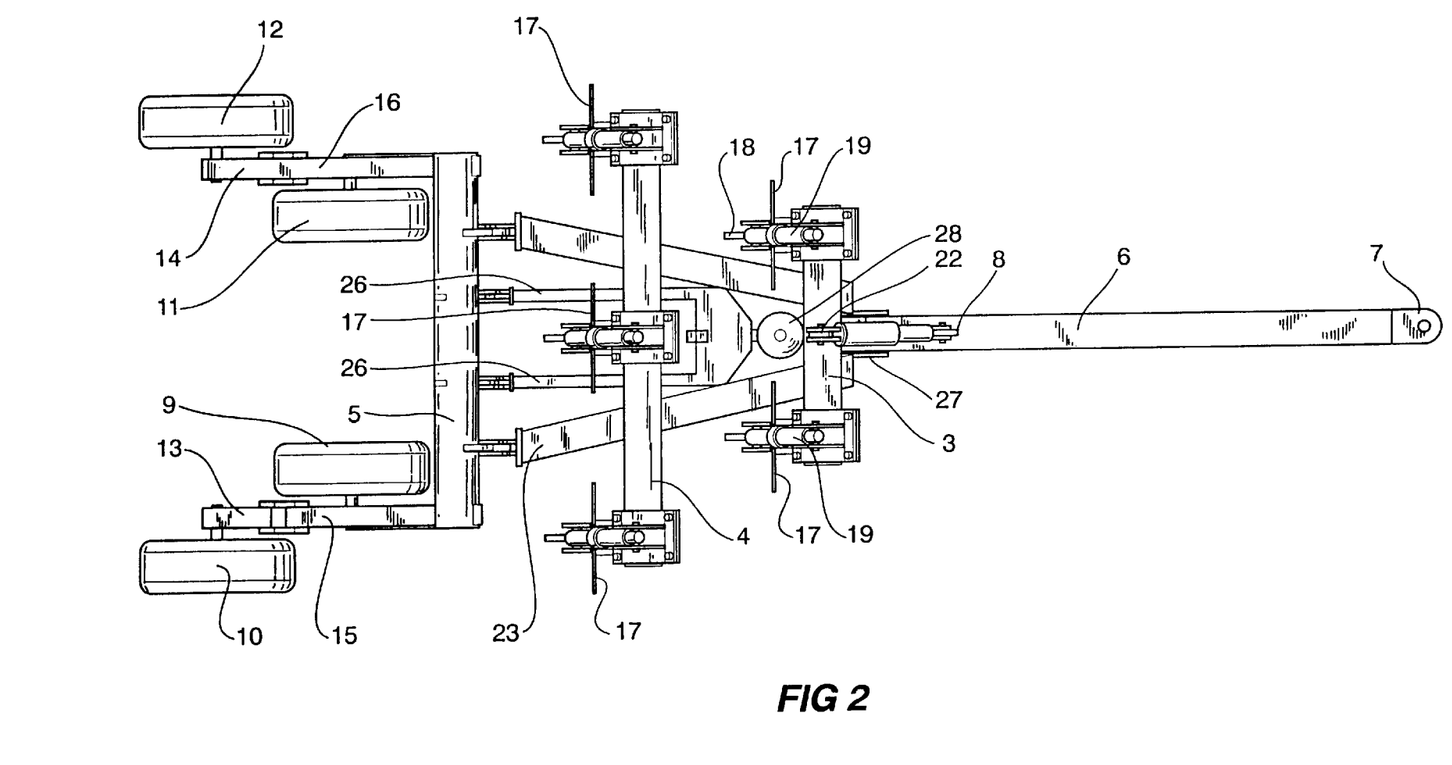
FIG. 2 is a plan view of the same embodiment as in FIG. 1.
Figure 3:
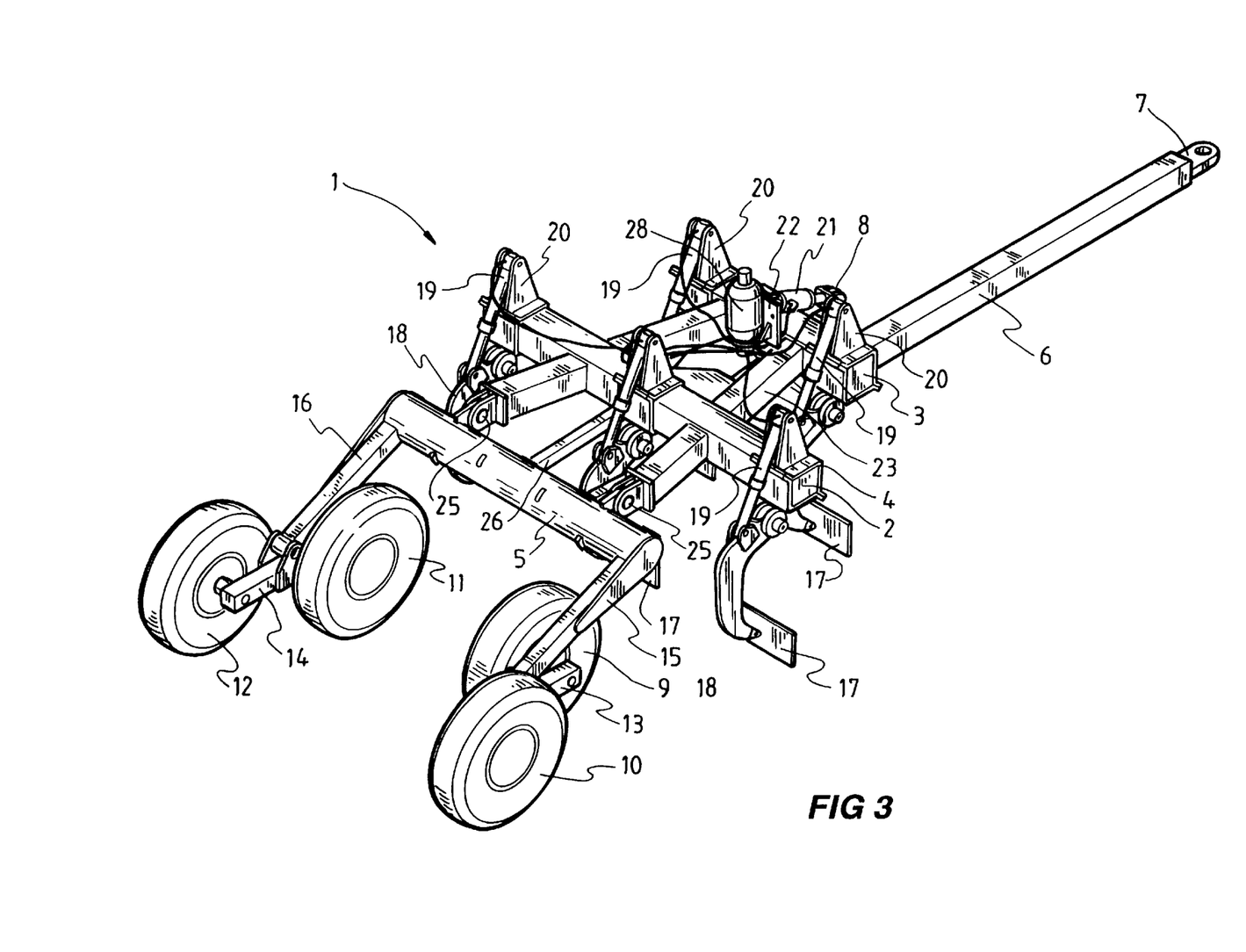
FIG. 3 Is a perspective view of the embodiment as shown in FIG. 2.
Figure 4:
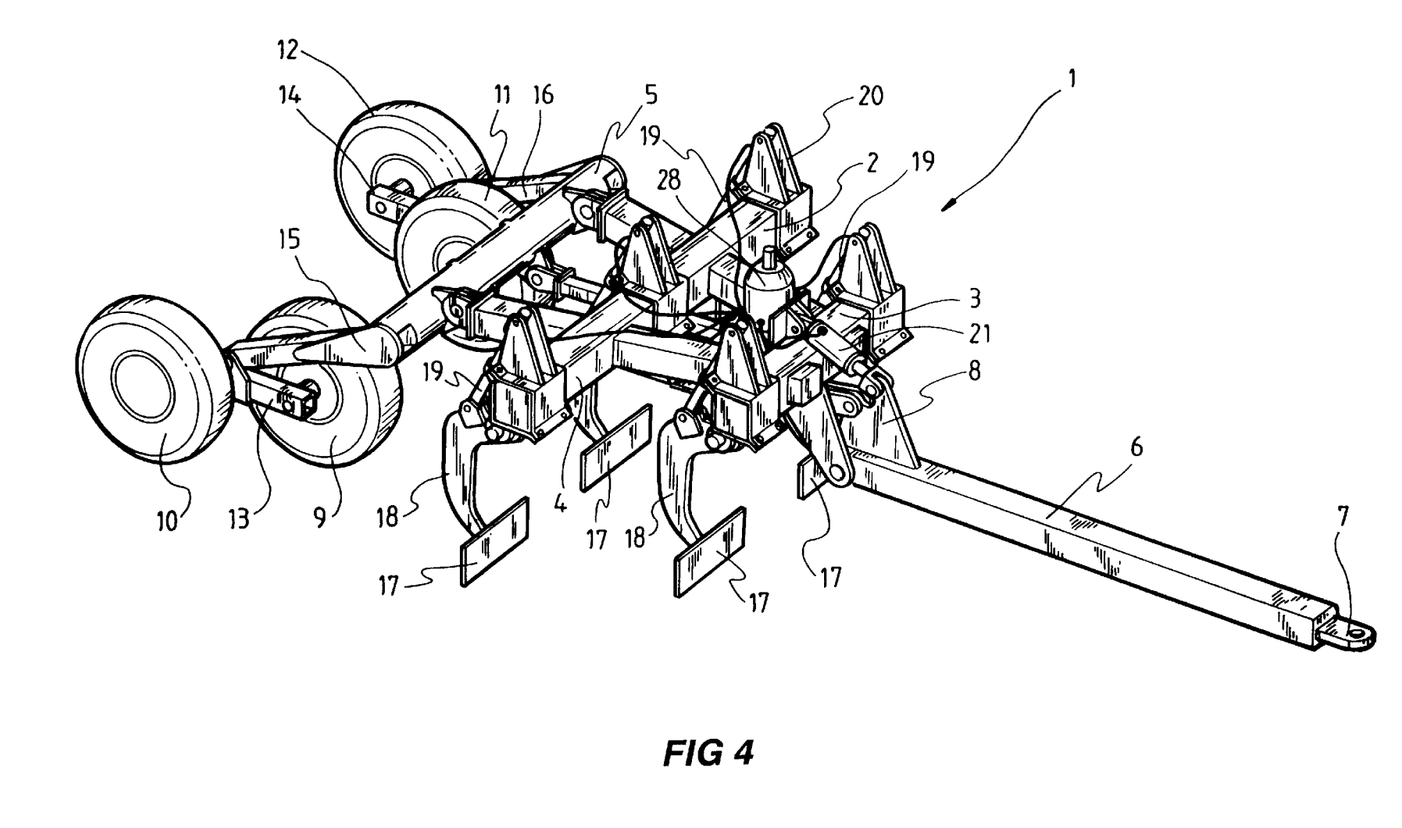
FIG. 4 is a further perspective view of the embodiment as shown in FIGS. 1, 2 and 3.
Figure 5:
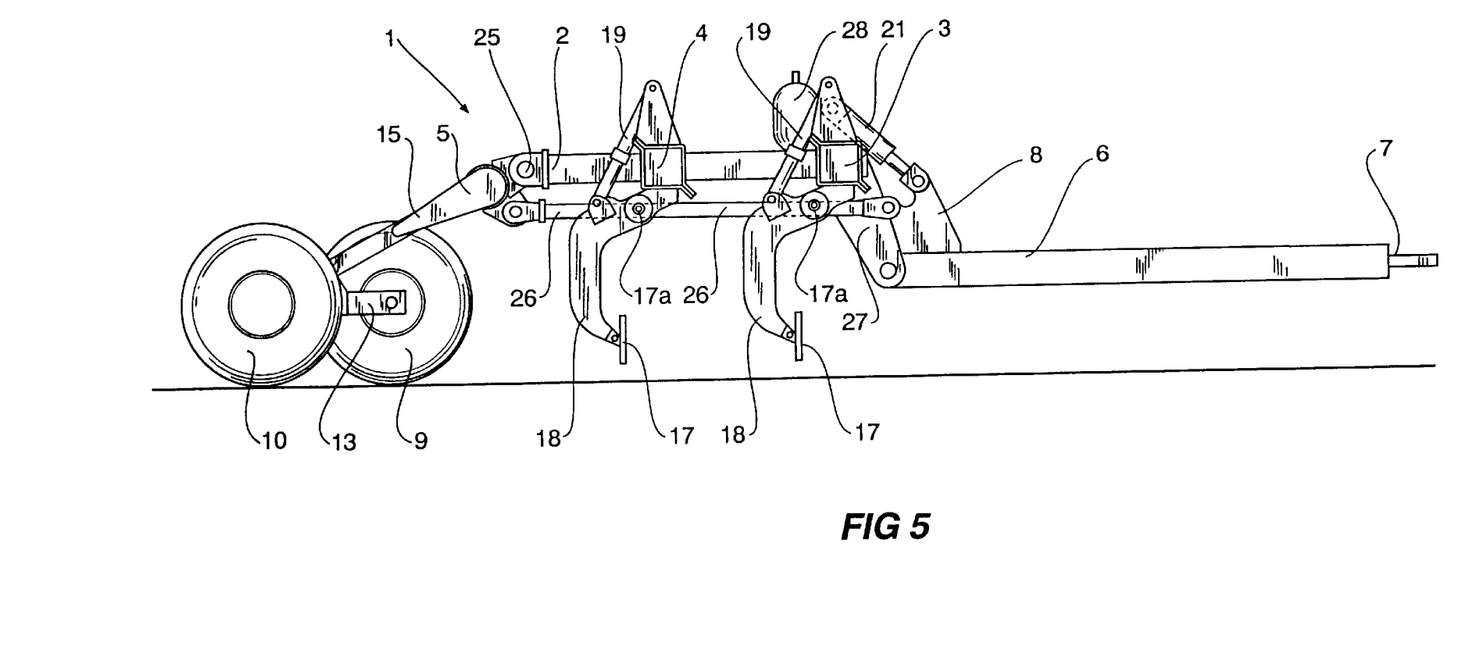
FIG. 5 is a side view of the grader as in FIG. 1 with the draft frame hydraulic ram being extended so as to show a collective lift to the blades.

There are also means to lift and lower the blades 18 collectively in the event the grading pressure against two or more blades is above a selected pressure. Such means include a hydraulic ram 21, and a linkage which includes elongate members 23 joined to the draft frame 2 by a pivot connection 22 at one end and pivot connection 25 at the other end and further elongate members 26 which are pivotally connected to the draft frame 2 at a front of the apparatus and the trailing arm support 5 at a back end. and arranged so that in one position of the draft frame hydraulic ram, the draft frame is supported in a higher position relative to the hitch point and the ground engaging wheels as compared to alternate position.

Figure 7:
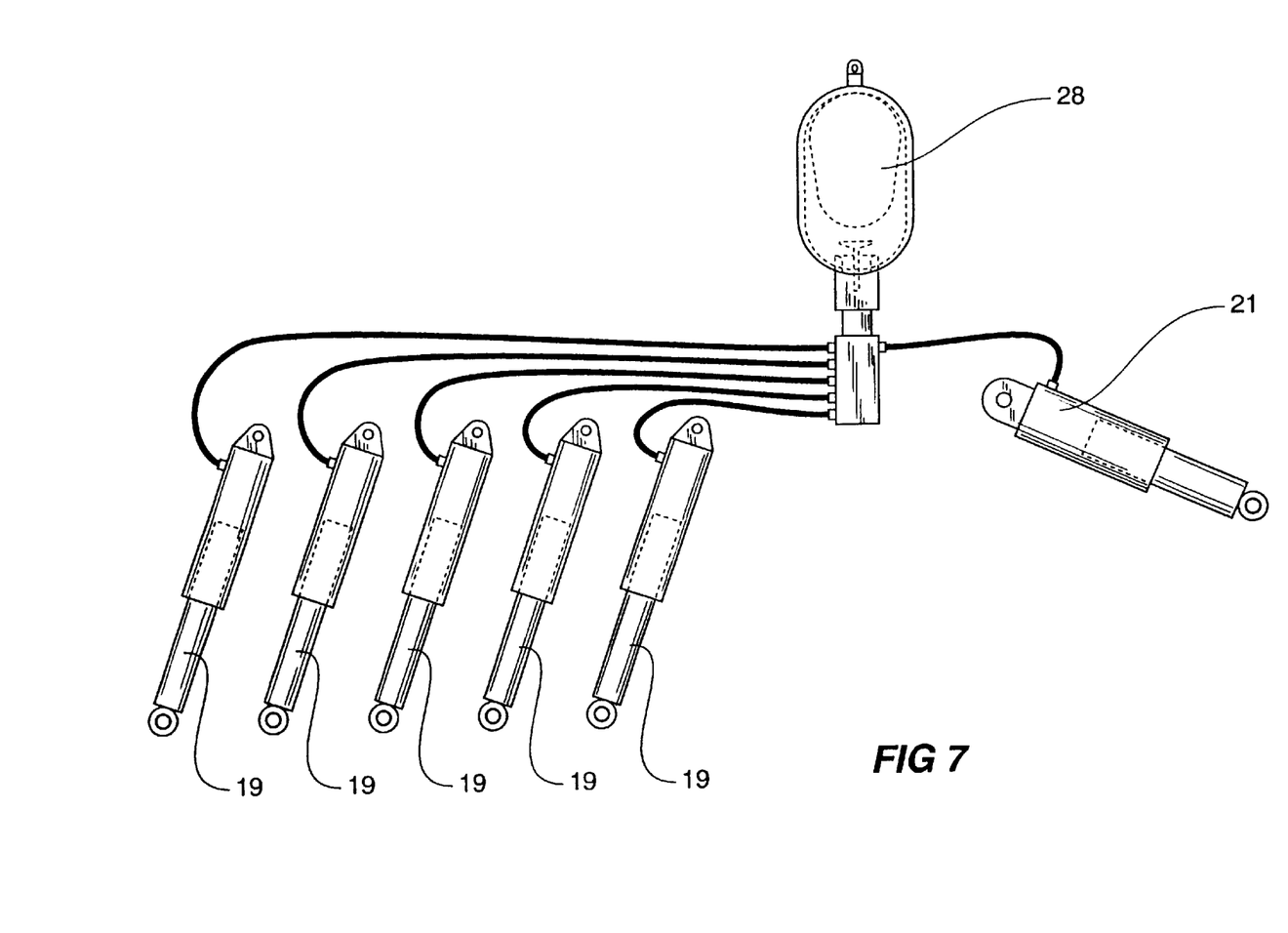
FIG. 7 is a schematic arrangement showing arrangement of the various hydraulic rams and hydraulically connected gas accumulator as used in the embodiment as is shown in FIGS. 1, 2, 3 and 4.

The pressure in each of the hydraulic rams 19 supporting each of the blades 18 is coupled to the common plenum gas accumulator 28 which also is coupled to the draft frame hydraulic ram 21. When additional pressure against the blades 18 occurs with such pressure being transmitted to each of the said hydraulic rams 19, then there is caused to be an increase in the plenum pressure of the gas accumulator which then results in some small increase in pressure in the draft frame hydraulic ram 21.

The linkage arrangement and the relative sizes of the rams and other parts are chosen so that if one blade 17 alone is under higher pressure then this will not result in a substantial increase in the length of ram 21. However, if two or more of the blades 18 are brought under substantial pressure at the same time then this will cause a more significant lengthening of the ram 21 and therefore a general raising of the level of the supporting cross arms 3 and 4 which will lift to a modest extent all of the blades 18.

This then works as a self levelling arrangement. The grader 1 can be used to be drawn behind a vehicle where supervision and constant monitoring of the blade levels is not so critical and further, the blades can be drawn along the road at a speed governed by the response available from the hydraulics and the clearing effect provided by the Inclining of the blade to provide a clearing effect rather than being constantly controlled in a manual way by an operator.

A further feature is that by having individual blades which are aligned in staggered fashion so that any individual blade engages only part of the surface to be graded, is that in the event that one blade strikes a rock, then the all up weight and therefore inertia available to resist a quick release of that blade from a grading position to a release position, is somewhat smaller than would be the case if there was one big single blade.

Further, while one blade is forced to incline rearwardly, the other blades continue to grade therefore at least continuing to provide an effective grading effect even though a single stone has not been shifted.

However, when two or more blades start to encounter rocks very much at the same time or encounter an amount of earth that means large stresses are starting to occur, then there is the effect that this will result in additional pressure from the several hydraulic rams being pushed into a release position which in turn then will raise the pressure in a draft frame hydraulic ram which then in turn will collectively lift all of the blades to a higher position at least until the substantial load is lessened.

In the embodiment, it has been found that a grader having these features can be used behind a four wheel drive motor vehicle and can be used as a grader without unduly stressing the hitch and other parts of the motor vehicle even though it is being pulled at a quite substantial speed of perhaps anything from 10 to 15 kph. What this means is that if a station owner wishes to, they can hitch such a grader behind their conventional four wheel drive motor vehicle and use the grader when proceeding along otherwise unmade tracks or low priority roads at a relatively high speed at least for grading purposes therefore guarding while traveling for other purposes.

What is claimed is:

1. A towed grader having at least two grader blades, each blade being positioned to effect grading of a surface, each blade being supported by a respective leg for each blade each of which is joined to a support frame by a pivot connection, the position of each blade being maintained in a forward most position by a hydraulic ram the pressure of which is governed by hydraulic pressure of fluid within the ram which fluid is hydraulically connected to an accumulator wherein the accumulator is mounted on the support frame so that the hydraulic pressure in each ram is substantially the pressure within the accumulator.

2. The grader according to claim 1 further characterized in that each hydraulic ram is coupled to the same accumulator.

3. The grader according to claim 1 further characterized in that the legs are each supported by a draft frame the height of which draft frame relative to the ground is changeable by change of pressure within each said hydraulic ram extending between parts of the frame, and where the fluid in the hydraulic ram is coupled to the hydraulic accumulator.

4. The grader according to claim 1 further characterized in that each blade is supported so as to be, when in its forward most position, entirely rearward of a vertical plane passing through the axis of the pivot support for the leg supporting that blade, so that rearward pivoting of the leg about its respective pivot will result in only rearward and upward motion of the blade relative to the pivot axis.

5. The grader according to claim 2, further characterized in that the legs are each supported by a draft frame the height of which draft frame relative to the ground is changeable by change of pressure within a hydraulic ram extending between parts of the frame, and where the fluid in the hydraulic ram is coupled to said hydraulic accumulator.

6. The grader according to claim 2, further characterized in that each blade is supported so as to be, when in its forward most position, entirely rearward of a vertical plane passing through the axis of the pivot support for the leg supporting that blade, so that rearward pivoting of the leg about its respective pivot will result in only rearward and upward motion of the blade relative to the pivot axis.

7. The grader according to claim 3, further characterized in that each blade is supported so as to be, when in its forward most position, entirely rearward of a vertical plane passing through the axis of the pivot support for the leg supporting that blade, so that rearward pivoting of the leg about its respective pivot will result in only rearward and upward motion of the blade relative to the pivot axis.

8. A towed grader including a hitch point on a draft frame, a hydraulic system having an accumulator mounted on the draft frame, at least one ground engaging wheel supporting the draft frame with respect to the ground, a plurality of grader blades each independently supported so as to present, in a staggered alignment, a grading face each with a lowermost grading edge, each of the blades being supported so as to assume at least two positions relative to the draft frame, a first of these being a grading position, and a second of these being a release position, the release position being achieved when pressure against the blade is in excess of a selected level, and means to lift or lower the blades collectively in the event the grading pressure against two or more of the blades collectively being above a selected pressure.

9. The grader as in claim 8 further characterized in that each of the blades is supported by a pivotal connection to the draft frame, and the blade is maintained in position by a hydraulic ram.

10. The grader according to claim 8 further characterized in that the means to lift or lower the blades collectively in the event the grading pressure against two or more blades is outside a selected range of pressures, includes a hydraulic ram, and a linkage arranged so that in one position of the draft frame hydraulic ram, the draft frame is supported in a higher position relative to the hitch point and the ground engaging at least one wheel as compared to an alternate position.

11. The grader according to claim 9 further characterized in that the pressure in each of the hydraulic rams supporting each of the blades is coupled to a common plenum gas accumulator which also is coupled to the draft frame hydraulic ram such that when additional pressure against the blades is effected with respect to the said hydraulic rams, then there is additional pressure from the accumulator being forced into the draft frame hydraulic ram.

12. The grader according to claim 9, further characterized in that the means to lift or lower the blades collectively in the event the grading pressure against two or more blades is outside a selected range of pressures, includes a hydraulic ram, and a linkage arranged so that in one position of the draft frame hydraulic ram, the draft frame is supported in a higher position relative to the hitch point and the ground engaging wheels as compared to alternate position.

13. The grader according to claim 9, further characterized in that the pressure in each of the hydraulic rams supporting each of the blades is coupled to a common plenum gas accumulator which also is coupled to the draft frame hydraulic ram such that when additional pressure against the blades is effected with respect to said hydraulic rams, there is additional pressure from the accumulator being forced into the draft frame hydraulic ram.

14. The grader according to claim 10, further characterized in that the pressure in each of the hydraulic rams supporting each of the blades is coupled to a common plenum gas accumulator which also is coupled to the draft frame hydraulic ram such that when additional pressure against the blades is effected with respect to said hydraulic rams, there is additional pressure from the accumulator being forced into the draft frame hydraulic ram.

15. A towed grader including a hitch point on a draft frame, a hydraulic system having an accumulator mounted on the draft frame at least one ground engaging wheel supporting and defining at least in part the height of the draft frame with respect to the ground, a plurality of grader blades each independently supported so as to present, in a staggered alignment, a grading face each with a lowermost grading edge, each of the blades being supported so as to assume at least two positions relative to the draft frame, a first of these being a grading position, and a second of these being a release position, the release position being achieved when pressure against the blade is in excess of a selected level.

16. The grader according to claim 15 further characterized in that there are further included means to lift or lower the blades collectively in the event the grading pressure against two or more of the blades collectively is above a selected pressure.

17. The grader according to claim 15 further characterized in that each of the blades is supported by a pivotal connection to the draft frame, and the blade is maintained in position by a hydraulic ram.

18. The grader according to claim 15 further characterized in that the means to lift or lower the blades collectively in the event the grading pressure against two or more blades is outside a selected range of pressures, and including a hydraulic ram, and a linkage arranged so that in one position of the draft frame hydraulic ram, the draft frame is supported in a higher position relative to the hitch point and the ground engaging wheels as compared to the alternative position.

19. The grader according to claim 16, further characterized in that each of the blades is supported by a pivotal connection to the draft frame, and the blade is maintained in position by a hydraulic ram.

20. The grader according to claim 16, further characterized in that the means to lift or lower the blades collectively in the event the grading pressure against two or more blades is outside a selected range of pressures, includes a hydraulic ram, and a linkage arranged so that in one position of the draft frame hydraulic ram, the draft frame is supported in a higher position relative to the hitch point and the ground engaging wheels as compared to the alternate position.

21. The grader according to claim 17, further characterized in that the means to lift or lower the blades collectively in the event the grading pressure against two or more blades is outside a selected range of pressures, includes a hydraulic ram, and a linkage arranged so that in one position of the draft frame hydraulic ram, the draft frame is supported in a higher position relative to the hitch point and the ground engaging wheels as compared to the alternate position.

22. A towed grader including a hitch point on a draft frame, wherein a hydraulic system having an accumulator is mounted on the draft frame, at least one ground engaging wheel supporting and defining at least in part the height of the draft frame with respect to the ground; a plurality of grader blades each independently supported so as to present, in a staggered alignment, a grading face each with a lowermost grading edge, each of the blades being supported so as to assume at least two positions relative to the draft frame, a first of these being a grading position and a second being a raised position, the grader being operational at speeds of 10 to 15 kph.

23. The grader according to claim 22, having operational characteristics to enable towing by a conventional four wheel drive motor vehicle.

\* \* \* \* \*